United States Patent
Tarmazdi

(10) Patent No.: US 12,182,161 B2
(45) Date of Patent: Dec. 31, 2024

(54) SYSTEM AND METHOD FOR USING PROBABILISTIC DATA STRUCTURE TO SYNCHRONIZE DATA BETWEEN A PLURALITY OF DATASETS

(71) Applicant: Honeywell International Inc., Charlotte, NC (US)

(72) Inventor: Hamid Tarmazdi, Park Holme (AU)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/170,981

(22) Filed: Feb. 17, 2023

(65) Prior Publication Data
US 2024/0281453 A1   Aug. 22, 2024

(51) Int. Cl.
*G06F 7/00* (2006.01)
*G06F 11/34* (2006.01)
*G06F 16/14* (2019.01)
*G06F 16/27* (2019.01)
*G06F 17/00* (2019.01)

(52) U.S. Cl.
CPC .......... *G06F 16/27* (2019.01); *G06F 11/3419* (2013.01); *G06F 16/152* (2019.01)

(58) Field of Classification Search
None
See application file for complete search history.

(56) References Cited

U.S. PATENT DOCUMENTS

| | | | |
|---|---|---|---|
| 2016/0092444 A1* | 3/2016 | Dornquast | G06F 11/1451 707/610 |
| 2018/0232703 A1* | 8/2018 | Chuang | G06Q 40/12 |
| 2019/0116238 A1* | 4/2019 | Bernard | H04L 67/568 |
| 2021/0026862 A1* | 1/2021 | Blaas | G06F 16/254 |

* cited by examiner

*Primary Examiner* — Tuan A Pham
(74) *Attorney, Agent, or Firm* — ALSTON & BIRD LLP

(57) ABSTRACT

A method for synchronizing data between a plurality of datasets includes receiving a request to match a subject record in a first dataset with a corresponding record in a remote second dataset based on at least one synchronization criteria, dividing the second dataset into a plurality of chunks each comprising a predetermined number of records, generating a probabilistic data structure respectively associated with a first of the plurality of chunks and configured to determine whether the corresponding record is contained in the first of the plurality of chunks, determining within a predetermined level of accuracy that the corresponding record is present in the first of the plurality of chunks based on the probabilistic data structure, and causing one or more attributes of the subject record to be synchronized with one or more attributes of the corresponding record.

17 Claims, 10 Drawing Sheets

SYSTEM AND METHOD FOR USING PROBABILISTIC DATA STRUCTURE TO SYNCHRONIZE DATA BETWEEN A PLURALITY OF DATASETS

TECHNICAL FIELD

Various embodiments of the present disclosure relate generally to systems and methods for synchronizing data between a plurality of datasets, and, more particularly, to using a probabilistic data structure to synchronize data between a plurality of datasets.

BACKGROUND

In modern computer-based data storage systems, there is often a need to compare and synchronize an item in one dataset to a corresponding item in another dataset. For example, an entity may have an internal database that must be synchronized with a database hosted by a third party. In conventional systems, comparison of such datasets is performed by searching for a record in the third-party database that shares a key value (e.g. object ID, name, etc.) with a record in the internal database. Without a way to limit the third-party database, all of the data must be searched linearly to find the target record. Consequently, the computational resources and time required to perform a matching operation is a function of the size of the third-party database, meaning the time and resource requirement can become prohibitive for synchronization of large datasets.

Various solutions have been proposed to reduce the required computational time and resources relative to linear searching. However, many such solutions (e.g. binary searching) rely on vertical scaling, which has practical limits when datasets reach a certain size. Additionally, some proposed solutions require intermediate storage of the data in memory, which is likewise impractical for large datasets.

The present disclosure is directed to overcoming one or more of these above-referenced challenges.

SUMMARY OF THE DISCLOSURE

In some aspects, the techniques described herein relate to a method for synchronizing user data between a plurality of datasets. In some embodiments, a method for synchronizing data between a plurality of datasets includes receiving, by at least one processor, a request to match a subject record in a first dataset with a corresponding record in a remote, second dataset based on at least one synchronization criteria; dividing, by at least one processor, the second dataset into a plurality of chunks each including a predetermined number of records; generating, by at least one processor, a probabilistic data structure respectively associated with a first of the plurality of chunks and configured to determine whether the corresponding record is contained in the first of the plurality of chunks; determining, by at least one processor, within a predetermined level of accuracy, that the corresponding record is present in the first of the plurality of chunks based on the probabilistic data structure; and causing, by at least one processor, one or more attributes of the subject record to be synchronized with one or more attributes of the corresponding record.

In some embodiments, a computer system for synchronizing data between a plurality of datasets may include at least one memory having processor-readable instructions stored therein, and at least one processor configured to access the memory and execute the processor-readable instructions. When executed by the processor, the instructions configure the processor to perform a plurality of functions, including functions for receiving, by at least one processor, a request to match a subject record in a first dataset with a corresponding record in a remote, second dataset based on at least one synchronization criteria; dividing, by at least one processor, the second dataset into a plurality of chunks each including a predetermined number of records; generating, by at least one processor, a probabilistic data structure respectively associated with a first of the plurality of chunks and configured to determine whether the corresponding record is contained in the first of the plurality of chunks; determining, by at least one processor, within a predetermined level of accuracy, that the corresponding record is present in the first of the plurality of chunks based on the probabilistic data structure; and causing, by at least one processor, one or more attributes of the subject record to be synchronized with one or more attributes of the corresponding record.

In some embodiments, a non-transitory computer-readable medium contains instructions synchronizing data between a plurality of datasets. The non-transitory computer-readable medium stores instructions that, when executed by at least one processor, configure the at least one processor to perform receiving, by at least one processor, a request to match a subject record in a first dataset with a corresponding record in a remote, second dataset based on at least one synchronization criteria; dividing, by at least one processor, the second dataset into a plurality of chunks each including a predetermined number of records; generating, by at least one processor, a probabilistic data structure respectively associated with a first of the plurality of chunks and configured to determine whether the corresponding record is contained in the first of the plurality of chunks; determining, by at least one processor, within a predetermined level of accuracy, that the corresponding record is present in the first of the plurality of chunks based on the probabilistic data structure; and causing, by at least one processor, one or more attributes of the subject record to be synchronized with one or more attributes of the corresponding record.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
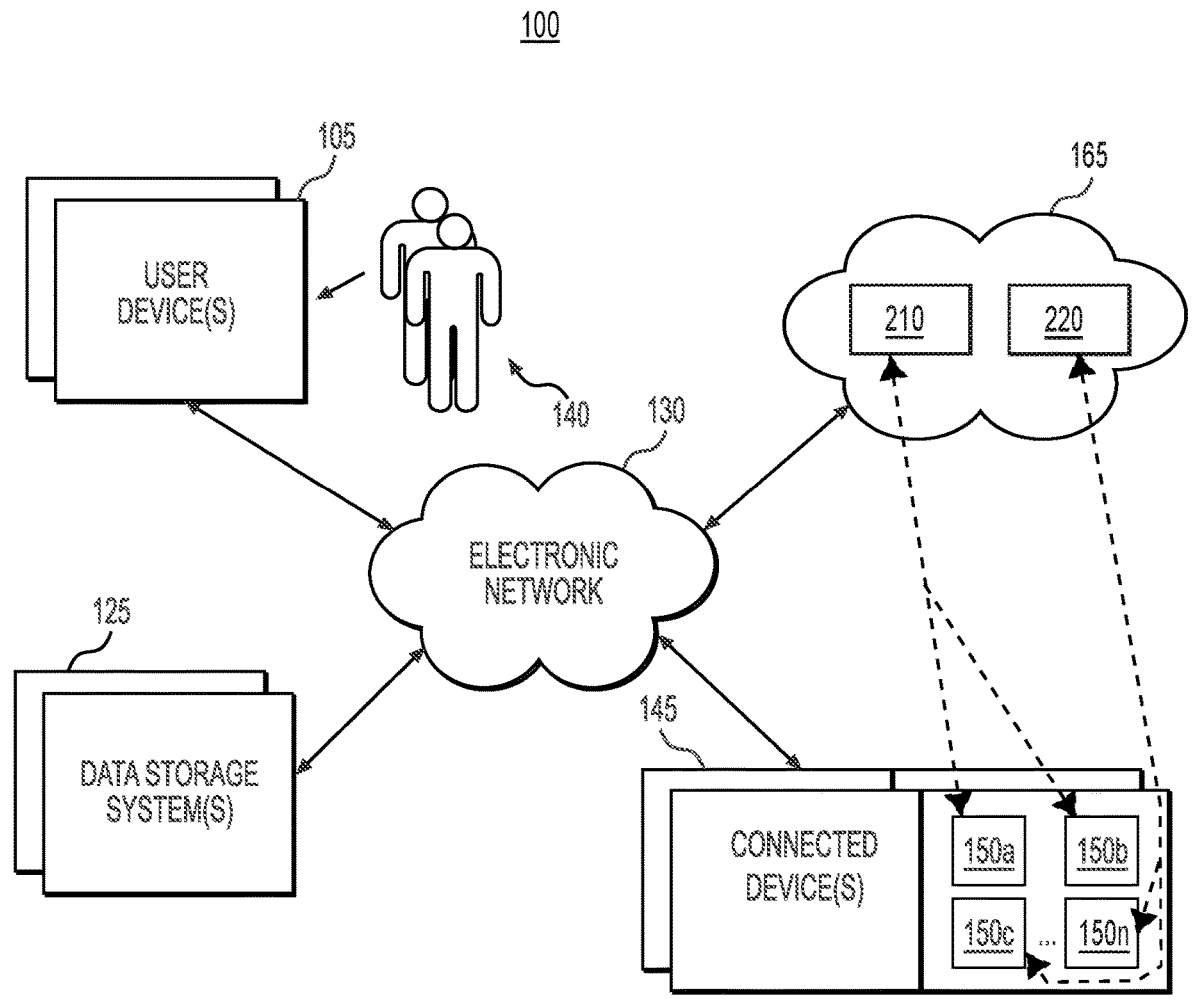
FIG. 1 depicts an exemplary environment for using a probabilistic data structure to synchronize data between a plurality of datasets, according to one or more embodiments.

Various embodiments of the present disclosure relate generally systems and methods for using a probabilistic data structure to synchronize data between a plurality of datasets. The systems and methods described herein may improve efficiency of synchronization operations, relative to conventional systems, by reducing the computational resources needed to perform such operations. In particular, the systems and methods herein utilize various techniques, as described in the following embodiments, to reduce the amount of data that needs to be received, transmitted, and stored on various devices in a connected network, thereby reducing processing and memory requirements of individual devices.

Furthermore, the present disclosure provides systems and methods for determining a virtual relationship between records in remote and/or disparate databases, not limited by conventional approaches that require equivalent keys of such records. Thus, the present disclosure allows for more robust matching and synchronizing operations than conventional approaches.

Subject matter will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended reflect or indicate that the embodiment(s) is/are "example" embodiment(s). Subject matter be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). Furthermore, the method presented in the drawings and the specification is not to be construed as limiting the order in which the individual steps may be performed. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" or "in some embodiments" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

As used herein, the term "relational database" and derivatives thereof mean a set of data organized into one or more tables of rows (which may also be referred to as records or tuples) and columns. Typically, each table represents one entity type, such as an object, user, customer, product, etc. Each row represents one record or instance of that entity, and each column represents attributes of that instance. For example, if a table represents users as the entity type, each row represents an individual user, and each column represents an attribute of that individual user (e.g. name, ID, contact information, physical description, etc.). Each row is assigned and identified by a unique key. The unique key is used to link data from multiple tables, for example a primary table and a secondary table. When used in the primary table, the unique key is referred to as a "primary key". The unique key can be included in a record located in the secondary table when that record has a relationship to a record having that key in the primary table. When the unique key is added to a record in the secondary table, it is referred to as a "foreign key" in the secondary table. The connection between the primary key and the foreign key then creates the relationship between records contained across the primary and secondary tables.

As used herein, the term "non-relational database" and derivatives thereof mean a set of data organized into non-tabular relations. Non-relational databases may also be referred to as NoSQL or non-SQL databases. Examples of non-relational databases include, but are not limited to, document data stores, column oriented data stores, key-value stores, document stores, and graph databases (GDB), and combinations thereof.

FIG. 1 depicts exemplary environment 100 that may be utilized with techniques presented herein. One or more user devices 105 used by one or more users 140 (e.g., an administrator of an internal data system), one or more data storage systems 125, one or more connected devices 145 may communicate across an electronic network 130, and storage 165. As will be discussed in further detail below, connected device(s) 145 may communicate with one or more of the other components of environment 100 across electronic network 130 in order to use one or more probabilistic data structures to match and synchronize records between multiple datasets. For example, environment 100 may facilitate synchronization of a dataset stored on user device(s) 105 with another dataset stored on data storage system(s) 125.

In some embodiments, components of environment 100 are associated with a common entity, e.g., an employee/contractor administration system, or the like. In some embodiments, one or more of the components of environment 100 are associated with a different entity than another. For example, data storage system(s) 125 may be owned and operated by a third party, e.g. a Sine Visitor Management service. Systems and devices of environment 100 may communicate in any arrangement. As will be discussed herein, systems and/or devices of environment 100 may communicate in order to share and or query data between one another. As will be discussed herein, systems and/or devices of environment 100 may have various permissions with respect to one another.

One or more user device(s) 105 may include an input/output device (e.g., a touchscreen display, keyboard, monitor, etc.) associated with the user 140. User device 105 may be configured to enable user 140 to access and/or interact with other systems in the environment 100. For example, user device 105 may be a computer system such as, for example, a desktop computer, a server, a mobile device, a tablet, etc. In some embodiments, user device 105 may include one or more electronic application(s), e.g., a program, plugin, browser extension, etc., installed on a memory of user device 105. In some embodiments, the electronic application(s) may be associated with one or more of the other components in the environment 100. For example, the electronic application(s) may include one or more of system control software, system monitoring software, software development tools, etc.

Data storage system(s) 125 may include a server system, an electronic data system, computer-readable memory such as a hard drive, flash drive, disk, etc. In some embodiments, data storage system 125 includes and/or interacts with an application programming interface for exchanging data to other systems, e.g., one or more of the other components of the environment 100. Data storage system 125 may include and/or act as a repository or source for object data, user data, etc.

One or more connected device(s) 145 may include a plurality of computational devices 150a-150n such as, for example, desktop computers, mobile devices, tablets, servers, etc. Computational devices 150a-150n may be arranged in a manner to facilitate horizontal scaling for executing various operations as discussed herein. That is, computational devices 150a-150n may be connected to electronic network 130 and/or to each other such that each of computational devices 150a-150n may contribute memory, processing power, etc. to perform an operation.

Storage 165 may be, for example, cloud-based storage and may contain various data arranged in disparate datasets, namely first dataset 210 and second dataset 220. Various records from first dataset 210 and second dataset 220 may be retrievable by various connected devices 145 to facilitate horizontal scalability, as will be described in detail below. In the illustrated embodiment, for example, certain records of first dataset 210 are distributed between computational devices 150a and 150b, and various records of second dataset 220 are distributed between computational devices 150c-150n. Storage 165 may contain data from various sources owned/operated by different entities (e.g. users, organizations, properties, etc.) Data in storage 165 may be stored using different (or no) database engines. In some embodiments, data stored in storage 165 may be generated on interactions of an entity to a cloud service.

In various embodiments, electronic network 130 may be a wide area network ("WAN"), a local area network ("LAN"), personal area network ("PAN"), or the like. In some embodiments, electronic network 130 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks-a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

Figure 2:
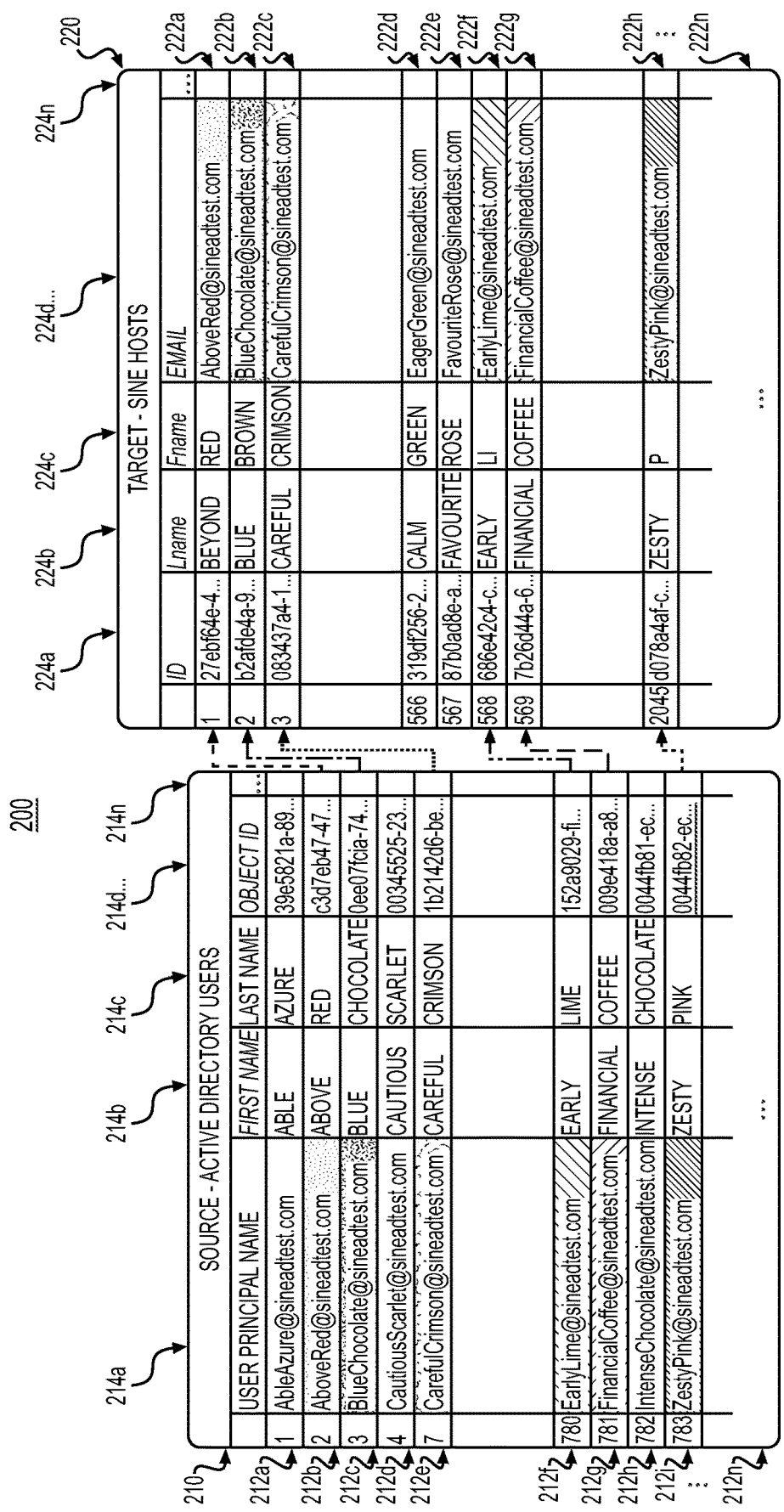
FIG. 2 depicts an exemplary relationship between a first dataset and a second dataset, according to one or more embodiments.

Referring now to FIG. 2, relationship 200 between first dataset 210 and second dataset 220 is illustrated. For clarity, only a subset of data in each of first dataset 210 and second dataset 220 is illustrated. First dataset 210 may be contained in cloud storage (e.g., cloud 165 of FIG. 1) and hosted in data storage distributed over multiple devices (e.g., user device 105 and/or connected devices 145). First dataset 210 includes a one or more records 212a-212n, each of which includes various attributes associated with one object, such as a user. Each of the devices (e.g. user device 105, connected devices 145) on which first dataset 210 is hosted may be correlated to one or more of records 212a-212n. The attributes are contained in a plurality of columns 214a-214n. First dataset 210 may be any of various types of databases (e.g., a relational database, a non-relational database, etc.) with each record having a unique key. In the illustrated example, user principal name (i.e. email address), stored in column 214a, serves as the key (or one of multiple, possible keys that is chosen as a comparison attribute) for each record 212a-212n. As will be described herein, the key chosen as the comparison attribute (i.e. user principle name/email address in FIG. 1) is used to match records 212a-212n with corresponding records in second dataset 220. In particular, one or more of records 212a-212n in first dataset 210 may have a key attribute (e.g., an email address) that corresponds to an attribute in a corresponding record in second dataset 220. In some embodiments, the key attribute of first dataset 210 may be equivalent (i.e., an exact match) to the corresponding attribute in corresponding record of second dataset 220. In other embodiments, records of first dataset and second dataset may not necessarily have equivalent attributes, but may have attributes that are relatable by an equation to establish correlation. That is, the relationship between the record attribute of the first dataset 210 and the corresponding record attribute in the second dataset may be a virtual relationship, not an equivalency relationship. This allows for matching and/or synchronizing operations to be performed between first and second datasets 210, 220 even when the relationship between those datasets are implicit rather than explicit (as in a conventional relational database). In some embodiments, first dataset 210 may include, for example Active Directory user data.

With continued reference to FIG. 2, second dataset 220 may be contained on a device, such as a server, associated with data storage system 125. Second dataset 220 may be remote from user 140, i.e. not stored on device controlled or directly accessible by user 140. Second dataset 220 includes a one or more records 222a-222n, each of which includes various attributes associated with one object, such as a user. The attributes are contained in a plurality of columns 224a-224n. In some embodiments, second dataset 220 may be a non-relational database. In other embodiments, second dataset 220 may be a relational database. In some embodiments, second dataset 220 may include, for example, Active Directory user data. Second dataset 220 is disparate and may be remote from first dataset 210, may be managed by a different provider than first dataset 210, may be owned by a different organization than first dataset 210, and/or may be use a different (or no) database engine relative to first dataset 210. In some embodiments, user 140 may have no querying permissions, or limited querying permissions, with respect to data storage system 125. Therefore, user 140 may not be able to directly query second dataset 220.

As shown in FIG. 2, certain records in second dataset 220 may contain a key attribute that correlates to a corresponding key attribute of one of the records in the first dataset 210. For example, record 222a in second dataset 220 contains a key attribute in column 224d corresponding to the key attribute in column 214a of record 212b of first dataset 210. Namely, the corresponding is attribute is case-insensitive email address "AboveRed@sineadtest.com". Thus, record 212b of first dataset 210 is related, or corresponds, to record 222a of second dataset 220. Based on the determination of this relationship, record 212b of first dataset 210 and record 222a of second dataset 220 may be synchronized by updating attributes of record 222a of second dataset 220 to match corresponding attributes of record 212b of first dataset 210, or vice versa, as will be described herein. Similar relationships exist between record 222b of second dataset 220 and record 212c of target dataset 210; between record 222c of second dataset 220 and record 212e of target dataset 210; between record 222f of second dataset 220 and record 212f of target dataset 210; between record 222g of second dataset 220 and record 212g of target dataset 210; and between record 222h of second dataset 220 and record 212i of target dataset 210. While in this example, the relationship between records of first and second datasets 210, 220 is based on equivalence of the key attribute (namely email address), in other embodiments, the relationship between records of first and second datasets 210, 220 may be based on other criteria than equivalence (e.g. satisfaction of an equation). Furthermore, relationships between records of first and second datasets 210, 220 may be based on a combination of multiple attributes in an individual record (i.e., a combination of two or more attributes of a record in dataset 220 may be used to correlate a record of first dataset 210).

Figure 3:
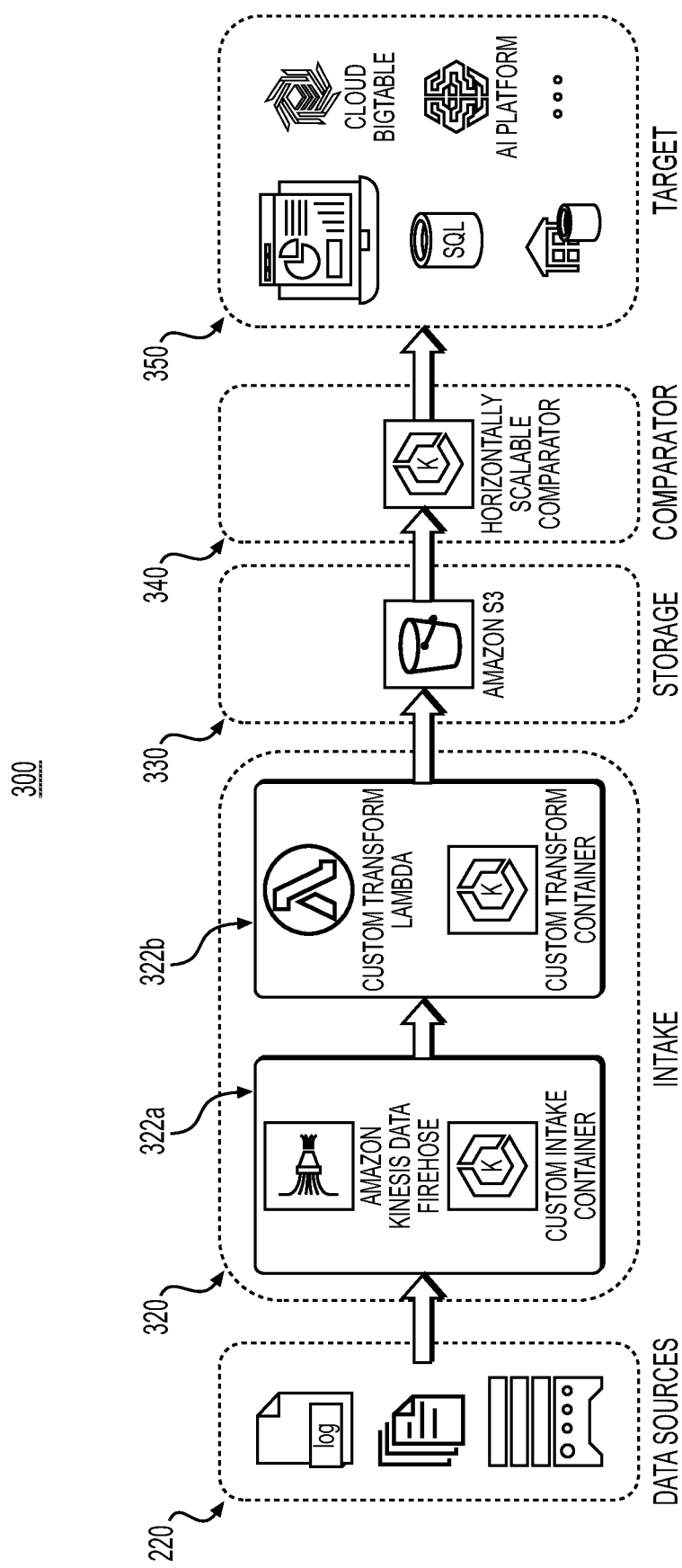
FIG. 3 depicts an architecture for processing a second dataset to subsequently compare records with another dataset, according to one or more embodiments.

Referring now to FIG. 3, an architecture 300 for processing external and/or unstructured sources of data to generate probabilistic indexed datasets. For examples, second dataset 220 may be processed to subsequently compare records with another dataset (e.g. first dataset 210 of FIG. 2) is illustrated. Architecture 300 includes second dataset 220, intake 320, storage 330, comparator 340, and target 350. Examples of commercial platforms that could be used to back up second dataset 220 within architecture 300 include Microsoft Azure Active directory and/or Sine Visitor Management Host records.

Intake 320 includes one or more services configured to receive (and/or obtain) data from second dataset 220, and to transform the received data into a predetermined format/structure that allows second dataset 220 to be compared to another dataset (e.g. first dataset 210 of FIG. 2). For example, in some embodiments, intake 320 may include first service 322a including Amazon Kinesis Data Firehouse with a custom intake container. Alternatively or additionally, intake 320 may include second service 322b including Amazon Web Services (AWS) custom transform Lambda and a custom transform container. Further details of intake 320 are described herein with reference to FIG. 4.

With continued reference to FIG. 3, storage 330 may include intermediate storage to temporarily hold and/or buffer data transformed by service(s) 322a-322b of intake 320. Storage 330 may be configured to receive streaming data, and may be automatically scalable to retain large amounts of data. In some embodiments, storage 330 may include a straightforward software development kit (SDK) that improves efficiency of architecture 300 due to incurring less developer time. The ability to support streaming data allows for an intake operation to be performed even when all of the data is not available at the beginning of the intake procedure. That is, data may be streamed to storage 330 continuously and/or intermittently as the data becomes available. This functionality is useful in situations where application logs are generated during the course of a day, such that new data is being generated after initiation of an intake operation. Storage 330 may have various levels of security depending on the sensitive of data being stored. In some embodiments, storage 330 may be cloud-based. Examples of suitable, commercially available services for storage 330 include Amazon S3 cloud storage and Google Cloud Storage.

With continued reference to FIG. 3, comparator 340 includes a horizontally scalable comparison algorithm able to run on a chunk of data. That is, comparator 340 is applied to a single chunk (i.e. a portion of predetermined size) of second dataset 220. The size of the chunk is independent of the overall data size of second dataset 220, and can be adjusted based on the number of chunks into which second dataset 220 is divided. Target 350 is the receiving target for results, which receives updates to records of second dataset 220 based on changes made to reference data (e.g., first dataset 210 of FIG. 2). In some embodiments, target 350 may be backed by a SQL database, a data warehouse such as BigQuery or Reshift, machine learning model(s), or any consumer of the processed result. In some embodiments, target 350 may include a Sine Visitor Management service.

Figure 4:
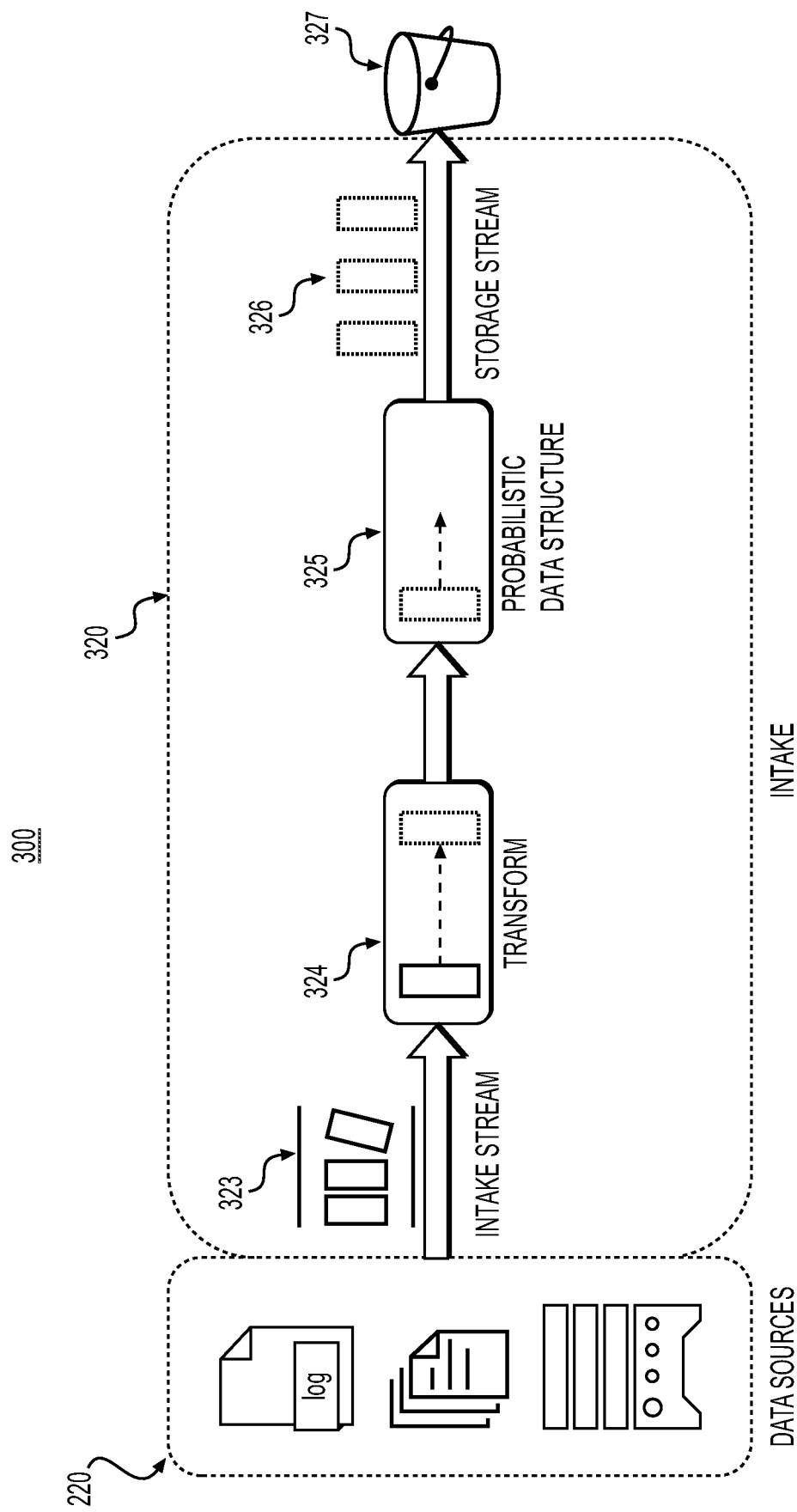
FIG. 4 depicts a detailed view of the intake of FIG. 3, according to one or more embodiments.

Referring now to FIG. 4, intake 320 is shown in greater detail. Intake 320 may receive data from second dataset 220 via intake stream 323. In some embodiments, intake stream 323 may include a horizontally scalable data pull script or similar service. Data received from intake stream 323 is then transformed by transformation module 324. Transformation module 324 may perform a custom transform to each record of second dataset 220, thereby transforming the data into a predetermined format/structure that allows comparison of the transformed data to another dataset. For example, transformation module 324 may convert each row of second dataset 220 (see FIG. 2) into a format/structure suitable for comparison to first dataset 210 (see FIG. 2). In some embodiments, intake stream 323 and transformation module 324 may be bundled as a managed solution, such as Amazon Kinesis Data Firehose.

With continued reference to FIG. 4, intake 320 may further include probabilistic data structure 325. Probabilistic data structure 325 may be configured to use one or more hash functions to determine whether relationship(s) exist between second dataset 220 and another dataset (e.g. first dataset 210 of FIG. 2). Probabilistic data structure 325 improves the efficiency of architecture 300 by comparing hash values of the data, rather the actual data itself. This significantly reduces the memory and/or processing requirements of a device on which probabilistic data structure 325 is executed. Moreover, memory and/or processing requirements are reduced because probabilistic data structure 325 can determine whether a particular chunk of data probabilistically contains a correlated record(s) of interest, and only such chunks of data are processed. Chunks of data that are determined to not contain correlated records of interest need not be processed, and therefore need not consume computing resources. In some embodiments, probabilistic data structure 325 includes a Bloom filter. Further details of probabilistic data structure 325 will be described in greater detail herein with reference to FIGS. 5-7.

With continued reference to FIG. 4, intake 320 may further include storage stream 326 which transmits (e.g., streams) the result of probabilistic data structure 325 to output data chunk 327. Output data chuck 327 includes the transformed data from probabilistic data structure 325 (as will be described below) and, in some embodiments, further includes probabilistic data structure 325 itself. In other embodiments, probabilistic data structure 325 is stored separately on a device having faster storage, with the trade-off of requiring additional processing resources.

Figure 5:
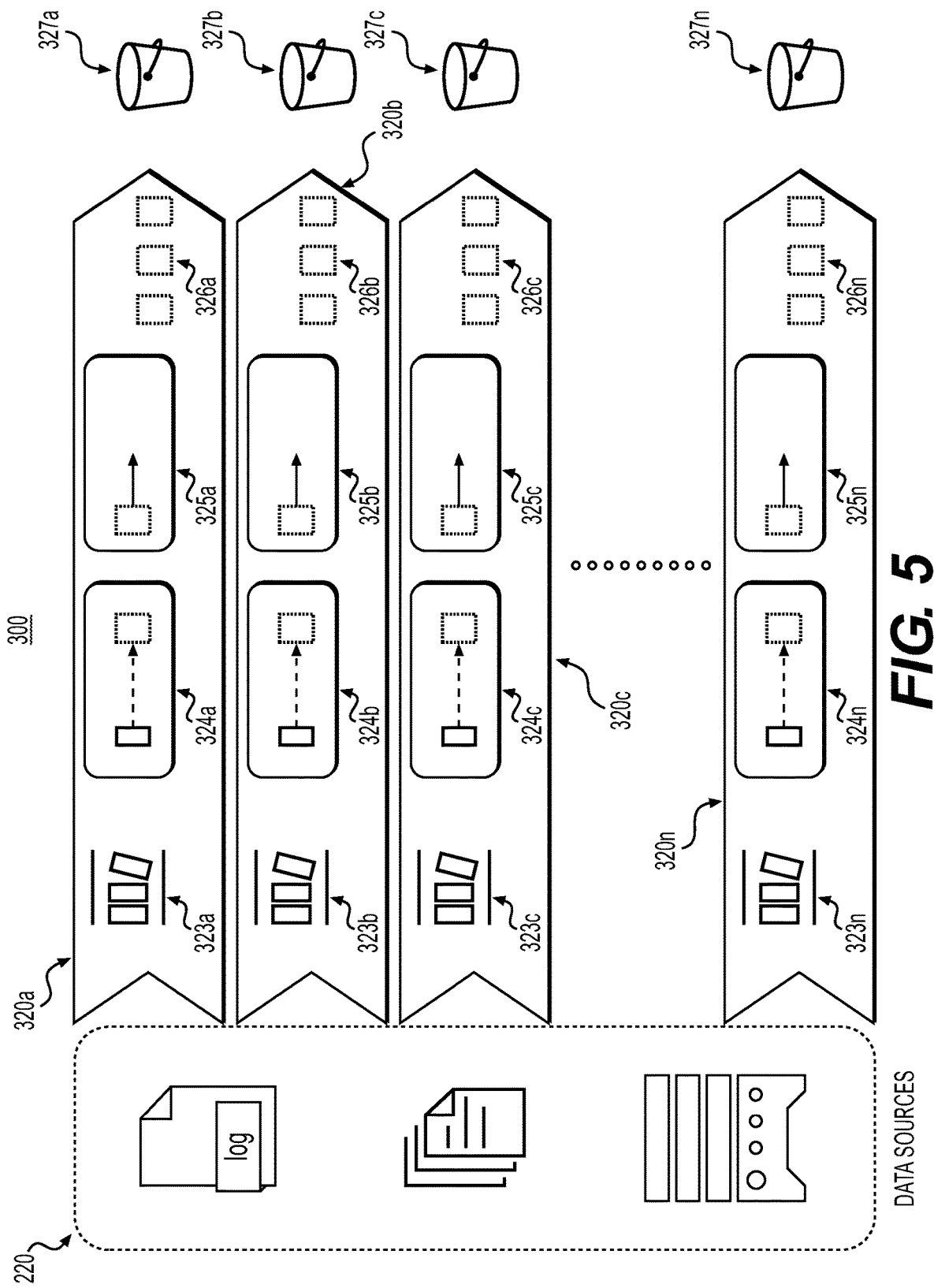
FIG. 5 depicts the architecture of FIG. 3 in an embodiment in which the dataset is divided into a plurality of chunks.

Referring now to FIG. 5, illustrated is an embodiment of architecture 300 in which second dataset 220 is divided into a plurality of chunks which are independently received by a corresponding plurality of intakes 320a-320n. Each of the plurality of intakes 320a-320n is functionally equivalent to intake 320 of FIG. 4, except that each of intakes 320a-320n receives only a predetermined subset (i.e. a "chunk") of the data from second dataset 220. In some embodiments, each of intakes 320a-320n receive approximately the same size chunk, whereas in other embodiments the chunk size may vary between intakes 320a-320n. The size of the individual chunks dictates the amount of computational resources required to execute probabilistic data structures 325a-325n. Probabilistic data structure 325a-325n of each intake 320a-320n can determine, with a predetermined accuracy, whether a subject record in a dataset (e.g. first dataset 210 of FIG. 2 exists in the chunk of data received by that intake 320a-320n. This determination is made without performing a linear search of the data in the chunk, thereby conserving computational resources. Rather, probabilistic data structures 325a-325n each utilize one or more hash functions to determine whether or not any of the records in the chunk contains the same key as the subject record.

In some embodiments, such as embodiments wherein probabilistic data structure 325 is a Bloom filter, probabilistic data structures 325a-325n utilizes a hash function to determine whether the any records in the chunk contain the same key as the subject record. That is, probabilistic data structure 325a-325n associated with each chunk of data determines whether that chunk includes a record, and so subsequently needs to be searched for that record. That is, probabilistic data structure 325a-325n does not on its own identify which particular record in the chunk corresponds to the subject record, only that one of the records in the chunk does. Once the probabilistic data structures 325a-325n determines that one or more of the chunks contains (or likely contains) an attribute key the corresponds to an attribute key in the subject record, only that chunk(s) will need to be searched (e.g., linearly searched) by a subsequent process to identity the corresponding record in the chunk. As described herein, correspondence of the attribute keys may be present if an attribute key of one or more records in the chunk satisfies a predetermined equation (such as, but not limited to, equivalency of the keys) establishing correlation to the attribute key of the subject record.

With continued reference to FIG. 5, the plurality of intakes 320a-320n may be distributed across multiple devices (e.g. computational devices 150a-150n of FIG. 1) making architecture 300 horizontally scalable. Thus, the computational resources for generation and use of the probabilistic data structure 325 of each intake 320a-320n may be spread amongst multiple devices, and the computational resources required of each of such devices 150a-150n may be matched to the capabilities of that device. Further, only that chunk(s) which is determined to likely contain the subject record must be subsequently searched to compete a synchronization operation. By only searching that chunk(s) that contain (or likely contain) the record, significant computational resources are conserved.

Figure 6:
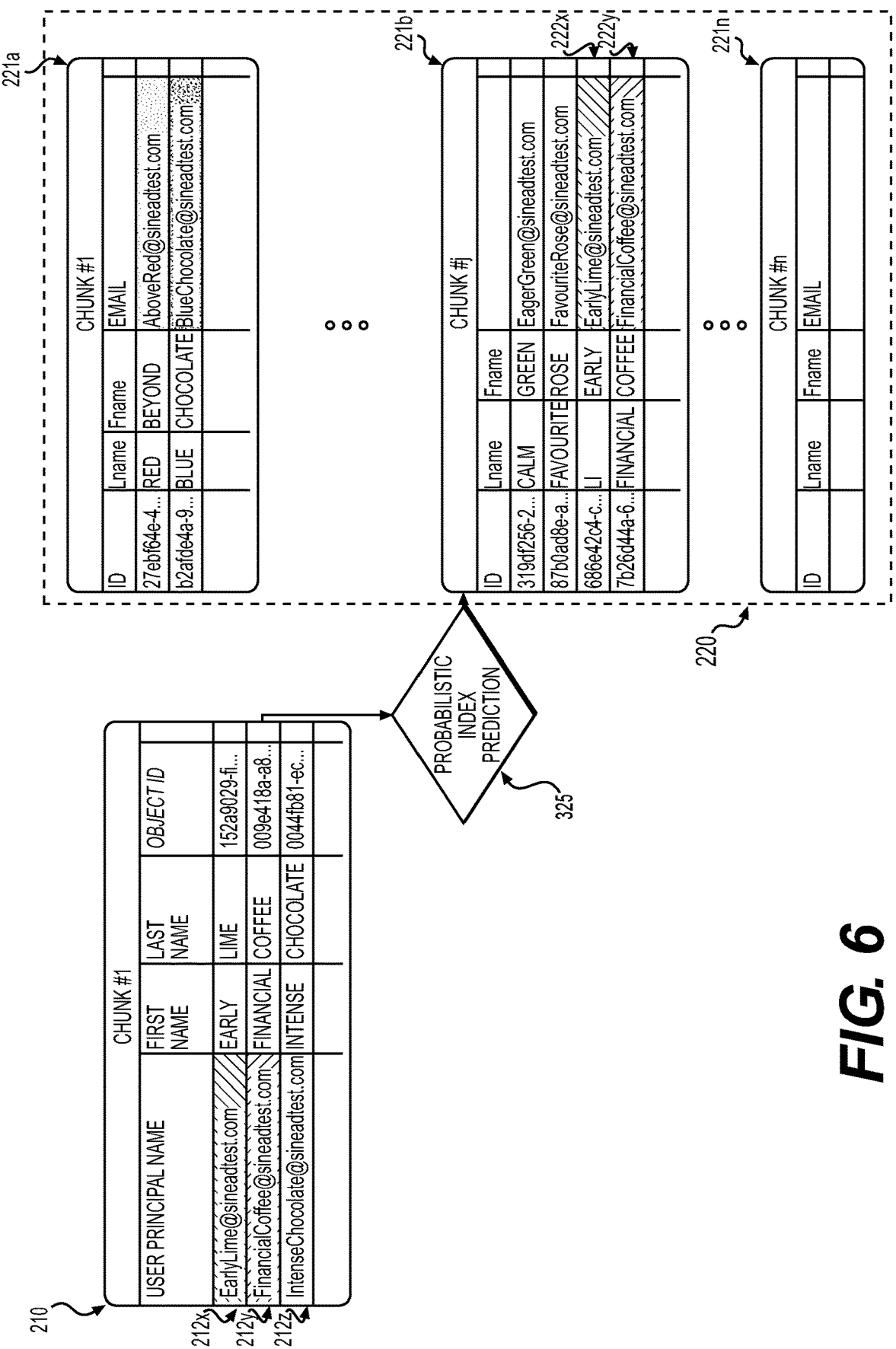
FIG. 6 depicts an exemplary use of applying a probabilistic data structure to a dataset, according to one or more embodiments.

Referring now to FIG. 6, an exemplary use of applying probabilistic data structure 325 (i.e., any of data structure 325a-325n of FIG. 5) is illustrated. In particular, probabilistic data structure 325 is used to match one or more records contained in first dataset 210 to one or more corresponding records in any of data chunks 221a-221n of a second dataset 220. Each record of first dataset 210 includes a subset (i.e. one or more) of attributes that satisfy an equation for indicating correlation of records. In the illustrated embodiment, each of the records of first dataset 210 represents a person (e.g. a user of a system), and the attribute "email address" serves as an attribute key for indicating correlation on the basis of an identical (notwithstanding case sensitivity) email address. Each record of chunks 221a-221n likewise represents a person, and contains an attribute of the person's email address. The email address attribute of chunks 221a-221n thus correlates certain records of chunks 221a-221n to corresponding records in first dataset 210. In particular, a relationship exists between each record of chunks 221a-221n includes the same email address as a record of first dataset 210. As noted, first and second datasets 210, 220 may be disparate such that no explicit relationship is stored in the system/architecture between datasets. Rather, the relationship between records is determined/generated by probabilistic data structure 325.

In the illustrated embodiment, the leftmost column of first dataset 210 includes email addresses (attribute selected as a correlation indicator) respectively associated with each record $212x$, $212y$, $212z$. The fourth-to-left column of chunks 221a-221n includes email addresses respectively associated with each record. None of the records of chunks 221a and 221c have attribute keys matching the corresponding attribute of any of records $212x$, $212y$, $212z$ of first dataset 210. (I.e., none of the email address attributes of records in chunks 221 and 221c match the email address attribute of records $212x$, $212y$, $212z$) However, record $222x$ of chunk 221b has an email address attribute matching that of record $212x$ of first dataset 210. As such, a relationship exists between record $222x$ of chunk 221b and record $212x$ of first dataset 210. Similarly, record $222y$ of chunk 221b has an email address attribute matching that of record $212y$ of first dataset 210. As such, a relationship exists between record $222y$ of chunk 221b and record $212y$ of first dataset 210.

Probabilistic data structure 325 is configured to determine, within predetermined accuracy, these and other relationships existing between first dataset 210 and any of chunks 221a-221n. Probabilistic data structure 325 need not identify the exact record and attributes in chunks 221a-221n that constitute the relationship(s). Rather, probabilistic data structure 325 is configured to only determine the likelihood that such relationship(s) exists. Probabilistic data structure 325 implements a hash function to determine the existence of such relationship(s). When probabilistic data structure 325 is applied to each of chunks 221a-221, probabilistic data structure 325 returns "not in chunk" if no relationship(s) exist between first dataset 210 and the subject chunk, or "probably in chunk" if relationship(s) may exist between first dataset 210 and the subject chunk. Thus, in the example illustrated in FIG. 6, probabilistic data structure 325 would return "probably in chunk" if applied to chunk 221b. In contrast, probabilistic data structure 325 would return "not in chunk" if applied to chunk 221a or chunk 221c (provided a false positive does not occur).

As noted herein, probabilistic data structure 325 does not determine which particular record(s) of chunk 221b are related to record(s) of first dataset 210. Subsequent processing (e.g. linear searching, binary searching, or the like) may be performed to actually identify the relationship(s) if probabilistic data structure 325 determines that relationship(s) may exist. That is, chunk 221b could be searched by a subsequent process to identify the related record(s) in dataset 210 and chunk 221b.

In embodiments in which probabilistic data structure 325 is a Bloom filter, probabilistic data structure 325 may be susceptible to false positives (i.e. returning an indication that a relationship exists when no relationship actually exists), but false negatives (i.e. returning that no relationship exists when a relationship actually exists) are impossible. False positives may be the result a collision in which the hash function (see FIG. 7) performed by probabilistic data structure 325. Because false negatives are impossible, there is no risk that probabilistic data structure 325 could miss the existence of a relationship in any of chunks 221a-221n. Thus, if probabilistic data structure 325 determines that any of chunks 221a-221c does not have relationship(s) with first dataset 210, there is 100% certainty that that chunk does not include a record containing a key corresponding to a key of first dataset 210.

Figure 7:
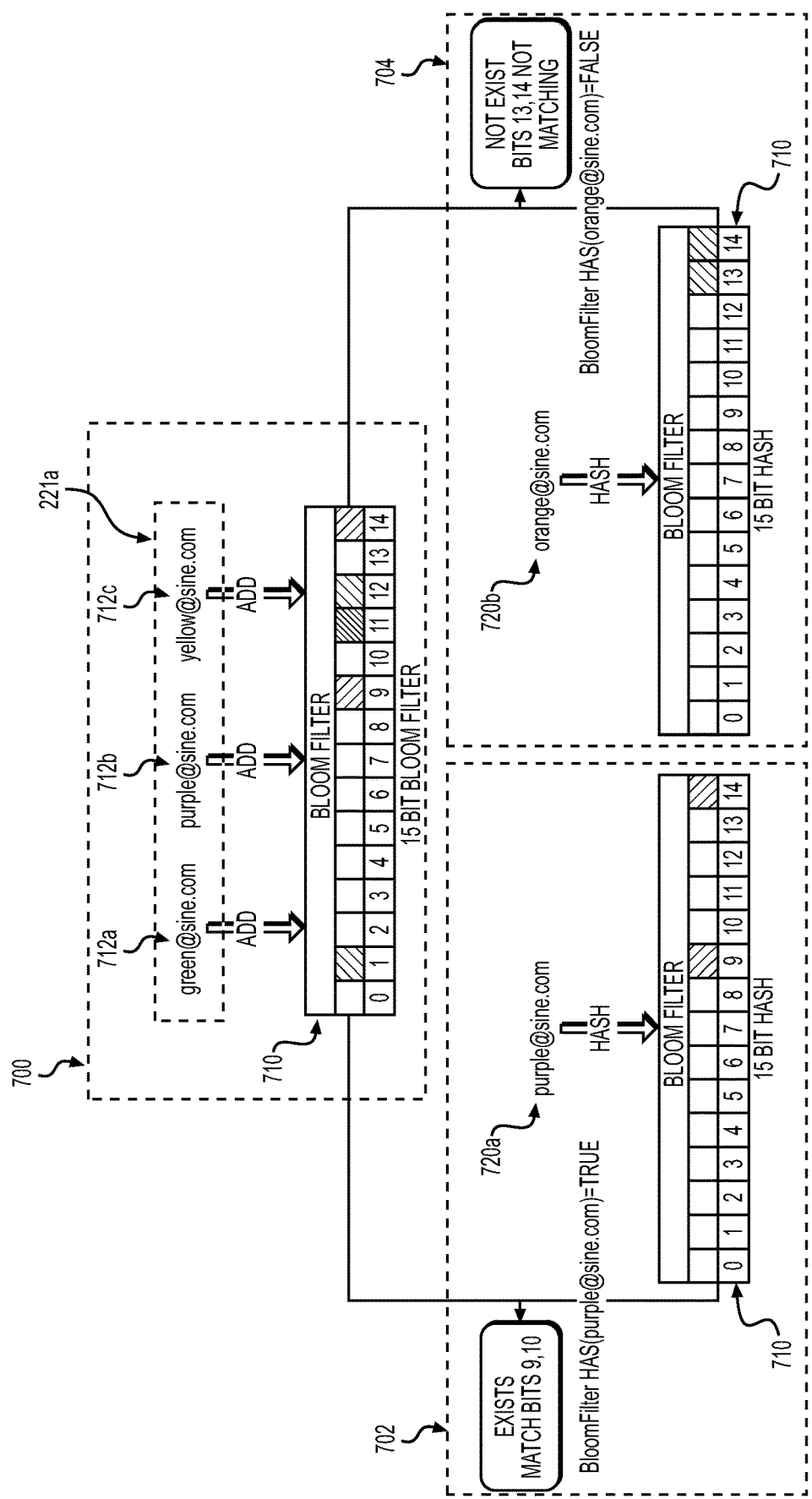
FIG. 7 depicts operation of one or more hash functions of the probabilistic data structure of FIG. 6, according to one or more embodiments.

With continued reference to FIG. 6 and additional reference to FIG. 7, probabilistic data structure 325 may implement one or more hash functions to determine the existence of relationships between datasets (e.g. dataset 210 and chunks 221a-221n). The embodiment of FIG. 7 depicts operation of hash functions where probabilistic data structure 325 includes a Bloom filter, though other forms of probabilistic data structure 325 may operate on the same or similar principles. Probabilistic data structure 325 adds data from a dataset (e.g. data from one of chunks 221a-221n) into bit vector 710 by performing a hash function 700 on keys 712a-712c of the records in the dataset. For purposes of illustrating the concepts shown in FIG. 7, it will hereinafter be assumed that keys 712a-712c are attributes of records contained in chunk 221a. Hash function 700 associates keys 712a-712c of the records of chunk 221a with one or more bits of bit vector 710. In the illustrated example, bit vector 710 includes 15 bits (i.e., bits 0-14). Hash function 700 may be any suitable transformation that converts keys 712a-712c into values that can be represented in bit vector 710. In the illustrated example, hash function 700 sets key 712a ("green@sine.co") to bit 11 of bit vector 710 (i.e., the value of bit 11 is set to 1). Hash function 700 sets key 712b ("purple@sine.co") to bits 9 and 14 of bit vector 710 (i.e., the value of bits 9 and 14 are is set to 1). Hash function 700 sets key 712c ("yellow@sine.co") to bits 1 and 12 of bit vector 710 (i.e., the value of bits 1 and 12 are is set to 1).

To determine whether a subject record from first dataset 210 exists in the chunk 221a, probabilistic data structure 325 performs a hash function (using the same transformation employed by hash function 700) on the attribute key of the given record of first dataset 210. If the hash function performed on the attribute key returns the same bit value as any of the keys added to bit vector 710 by hash function 700, probabilistic data structure 325 determines that the record from exemplary dataset exists in chunk 221a (i.e., probabilistic data structure 325 returns "probably in chunk"). (Note that this assumes that the result is not a false positive, as will be discussed in greater detail herein). Conversely, if the hash function performed on the attribute key returns a bit value different from any of the keys added to bit vector 710 by hash function 700, probabilistic data structure 325 determines that the record from first dataset 210 does not exist in chunk 221a (i.e., probabilistic data structure 325 returns "not in chunk". (Note that a false negative is not possible in a Bloom filter.)

Hash function 702 and hash function 704 illustrate these concepts. Hash function 702 illustrates a scenario in which there exists a relationship between a subject record in dataset 210 and a corresponding record in chunk 221a. As shown, hash function 702 is performed on attribute key 720a ("purple@sine.co") of a subject record in dataset 210. Because ("purple@sine.co") is also the value of key 712b of chunk 221a, a relationship exits. When hash function 702 is applied to attribute key 720a, hash function 702 returns a value of 1 for bits 9 and 14 of bit vector 710, the same value as when key 712b was hashed with hash function 700. Because the value of bit vector 710 is the same, probabilistic data structure 325 returns "probably in chunk".

Hash function 704 illustrated a scenario in which no relationship exists between a given record in dataset 610 and any records in chunk 221a. As shown, hash function 704 is performed on attribute key 720b ("orange@sine.co") of a given record in dataset 210. Because ("orange@sine.co") is not the value of any of keys 712a-712c of chunk 221a, no relationship exits. When hash function 704 is applied to attribute key 720b, hash function 704 returns a non-matching value of bit vector 710 (as illustrated, a value of 1 for bits 13 and 14 as shown). Because the value returned by hash function 704 does not match the value of bit vector 710 associated with any of keys 712a-712c, probabilistic data structure 325 returns "not in chunk".

In the embodiment of FIG. 7, bit vector 710 includes 15 bits for purposes of illustrating concepts of the present disclosure. In other embodiments, bit vector 710 may include substantially any number of bits, for example approximately 100 bits or approximately 1000 bits. Whatever the size of bit vector 710, the actual data of first dataset 210 and chunk 221a need not be stored in memory of the device(s) (e.g. computational devices 150a-150b of FIG. 1) running probabilistic data structure 325. Rather, only the hash values in bit vector 710 generated by hash functions 700, 702, 704 need to be stored in memory of the device(s) running probabilistic data structure 325. Thus, memory and processor requirements are significantly reduced relative to conventional systems and processes (e.g. linear searching).

In the foregoing descriptions, hash functions 700, 702, 704 were implied as being singular hash functions. However, each of hash functions 700, 702, 704 may include multiple hash functions to map the keys to bit vector 710. As will be described herein, using multiple hash functions and/or increasing the number of hash functions can reduce the occurrence of false positive results from probabilistic data structure 325.

As noted herein, probabilistic data structure 325 may be susceptible to returning false positives, particularly if probabilistic data structure 325 includes a Bloom filter. A false positive may occur, for example, when the transformation used by hash function 700 produces the same values in bit vector 710 for two different keys. That is, hash function 700 may generate the same bit value for a first key ("key A") and a second, different key ("key B"). This is referred to as a collision. If key A is added to bit vector 710 by hash function 700, and hash function 702 is subsequently performed on key B, probabilistic data structure 325 will return "probably in chunk" because probabilistic data structure 325 cannot differentiate between the hashes of key A and key B. Various algorithms may be implemented to address, and/or reduce the occurrence of, such collisions.

In contrast, false negatives are not possible when probabilistic data structure 325 includes a Bloom filter. Thus, there cannot be a scenario in which probabilistic data structure 325 returns "not in chunk" when there actually is a relationship between the subject attribute key of dataset 210 and chunk 221a. That is, if probabilistic data structure 325 returns "not in chunk", the attribute key definitely does not exist in chunk 221a, with 100% certainty.

Probabilistic data structure 325 may be tuned to improve accuracy (i.e., reduce the occurrence of collisions ultimately leading to false positives) in the hash function 700. Probability ("p") of probabilistic data structure 325 returning a false positive is a function of (i) number of items in the filter ("n"); (ii) number of bits in the bit vector (m); and (iii) number of hash functions (k). Thus, one way to improve accuracy of probabilistic data structure 325 is to reduce the number of items (n) in the filter—i.e., reduce the number of records in each chunk 221a-221n. This requires dividing second dataset 220 into more chunks to include the entirety of the dataset. Another way to improve accuracy of probabilistic data structure 325 is to increase the size (m) of bit vector 710. Increasing the size of bit vector 710, however, increases memory and/or processing demand of the device(s) (e.g. computational devices 150a-150b of FIG. 1) running probabilistic data structure 325. Another way to improve accuracy of probabilistic data structure 325 is to increase the number of hash functions (k)—i.e., use more hash functions to map the keys to bit vector 710. This, again, increases memory and/or processing demand of the device(s) (e.g. computational devices 150a-150b of FIG. 1) running probabilistic data structure 325.

Figure 8:
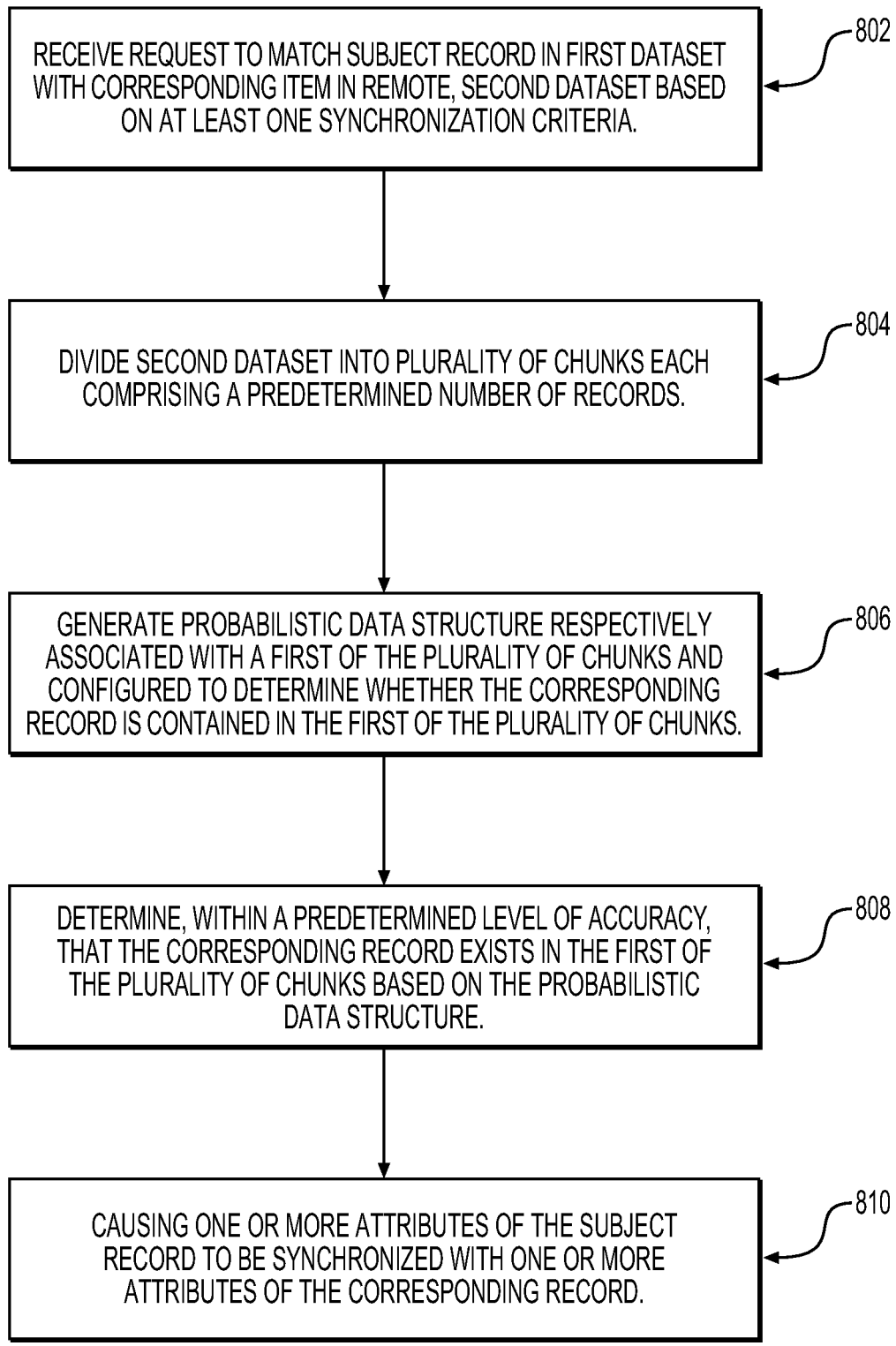
FIG. 8 depicts a flowchart of a method for synchronizing data between a plurality of datasets, according to one or more embodiments.

Having generally described the architecture, operation, and implementation of probabilistic data structures 325a-325n, method 800 utilizing probabilistic data structure to synchronize records between a plurality of datasets is illustrated in FIG. 8. Each of steps 802-810 of method 800 may be performed automatically be at least one processor, such as included in controller 1000 (see FIG. 10), associated with user device(s) 105, data storage system(s) 125, electronic network 130, and/or connected device(s) 145 of FIG. 1. In some embodiments, each of steps 802-810 are performed by controller 1000 associated with user device(s) 105. In some embodiments, each of steps 802-810 are performed by controller 1000 associated with data storage system(s) 125. In some embodiments, each of steps 802-810 are performed by controller 1000 associated with connected device(s) 145. In some embodiments, steps 802-810 are performed by a plurality of connected controllers. For example, some of steps 802-810 are performed by a controller associated with user device(s) 105, and others of steps 802-810 are performed by a controller associated with connected device(s) 145.

As shown in FIG. 8, method 800 includes, at step 802, receiving a request to match a subject record in first dataset 210 with a corresponding record in a remote, second dataset 220 based on at least one synchronization criteria. In this context, the term "remote" means that second dataset 220 is stored in different memory than first dataset 210. For example, first dataset 210 may include Active Directory data stored in memory one or more user devices 105 (see FIG. 1), whereas second dataset 220 may include user data stored by a third party (e.g., Sine Visitor Management host) in data storage system 125. In some embodiments, the device on which first dataset 210 is stored does not have permission to directly query second dataset 220. In some embodiments, first dataset 210 and second dataset 220 may be user datasets, containing records relating to persons (e.g., employees, contractors, users of a system, members of an organization, etc.). In other embodiments, first dataset 210 and second dataset 220 may contain records relating to companies, properties, assets, etc.

With continued reference to step 802, the request may be generated by user 140 (see FIG. 1), or may be automatically generated by user device 105, data storage system 125, or electronic network 130. Synchronization criteria may include, for example, any attribute or combination of attributes that satisfy an equation (including but not limited to equivalency) for determining correlation between the subject record in first dataset 210 and corresponding record(s) in second dataset 220. Examples of such synchronization criteria may include a user email address, a user name, a user identification code, a phone number, a business identification number, a car plate numbers, a property address, and/or essentially any attribute that can be used as a basis for determining a correlation between records in different datasets.

With continued reference to FIG. 8, at step 804, method 800 includes dividing second dataset 220 into plurality of chunks 221a-221n. Each of plurality of chunks 221a-221n includes a predetermined number of records of second dataset 220. As described herein, the size of each chunk 221a-221n (i.e., the number of records contained in each chunk) may be selected based on the available computational resources (e.g., memory and processing power) of the devices on which architecture 300, and particularly probabilistic data structure 325a-325n, is implemented. For example, the size of each chunk 221a-221n may selected to keep memory usage of probabilistic data structure 325a-325n below a predetermined threshold. In some embodiments, each chunk 221a-221n is the same size, although this need not be the case. In the case of chunks 221a-221n being different sizes, the probability of a false positive may be inconsistent between chunks, with larger chunks being more likely to produce a false positive.

With continued reference to FIG. 8, at step 806, method 800 includes generating a probabilistic data structure 325a respectively associated with a first of the plurality of chunks 221a. Probabilistic data structure 325a is configured to determine whether the corresponding record is contained in the first of the plurality of chunks 221a. Probabilistic data structures 325b-325n are likewise generated and respectively associated with the remaining chunks 221b-221n. In some embodiments, probabilistic data structures 325a-325n each include a Bloom filter. In some embodiments, generating the probabilistic data structure includes performing one or hash functions on keys of records in the associated chunk 221a-221n to map the keys to bit vector 710, as described herein with reference to FIG. 7. Each of probabilistic data structures 325a-325n is stored in memory of one or more devices in a horizontally scalable network. For example, each of probabilistic data structures 325a-325n may be stored on a separate device (e.g. store on separate computation devices 150a-150n of FIG. 1) in communication with network 130.

With continued reference to FIG. 8, at step 808, method 800 includes determining, within a predetermined level of accuracy, that the corresponding record is present in the first of the plurality of chunks 221a based on the probabilistic data structure 325a. In particular, probabilistic data structure 325a performs one or more hash functions (e.g. hash functions 702, 704 of FIG. 7) on the attribute key of subject record of first dataset 210 to determine whether a relationship exists between subject record and any record in chunk 221a, as illustrated in FIG. 7. The level of accuracy is the rate at which the probabilistic data structure correctly determines that such a relationship exists, without giving a false positive result. As noted herein, a false negative is not possible if probabilistic data structure 325a includes a Bloom filter. As described herein, the accuracy of probabilistic data structure 325a can be adjusted by altering the number of records in the filter (n); number of bits in the bit vector (m); and/or number of hash functions (k). In some embodiments, the level of accuracy is at least 99%, meaning that the probabilistic data structure returns a false positive a maximum of 1% of the time.

In some embodiments, step 808 may repeated for each chunk 221b-221n to identify all chunks with contain a record corresponding to the subject record of dataset 210. Any chunks 221b-221 that do not include a record corresponding to the subject record are then omitted from the remaining steps of method 800. For example, second chunk 221b may not contain a record corresponding to the subject record of dataset 210, so method 800 may include determining that a corresponding record does not exist in second chunk 221b based on probabilistic data structure 325b.

With continued reference to FIG. 8, at step 810, method 800 includes causing one or more attributes of the subject record of dataset 210 to be synchronized with one or more attributes of the corresponding record of chunk 221a of second dataset 220. In some embodiments, synchronization may include updating values of one or more attributes of the subject record in first dataset 210 to match the values of corresponding attributes in the corresponding record in second dataset 220. In some embodiments, synchronization may include updating values of one or more attributes of the corresponding record in second dataset 220 to match the values of corresponding attributes in subject record in first dataset 210.

Step 810 may be repeated for each chunk 221b-221 that contain a record corresponding to the subject record of dataset 210, as determined at step 808. Step 810 is not performed for any chunks 221a-221n that do not contain a record corresponding to the subject record of dataset 210. Thus, computational resources are not wasted processing chunks that will be of no value in the synchronization operation.

In some embodiments, causing synchronization may be performed directly by a processor of user device 105—i.e. the processor of user device 105 changes one or more attributes in the first and/or second dataset. In other embodiments, particularly where user device 105 does not have direct access to second dataset 220, causing synchronization may include the processor of user device 105 sending a request to another processor/device (e.g. a processor of data storage system 125) to perform synchronization of the subject record and corresponding record. In some examples, causing synchronization may occur automatically at predetermined time intervals, independent of user involvement. In some examples, causing synchronization may occur automatically in response to a triggering event, independent of user involvement.

In some embodiments, each of the plurality of chunks 221a-221n is synchronizable independent of the other chunks. That is, synchronization of records in the first chunk 221a can be performed without any activity being performed on the other chunks. Thus, if the corresponding record is determined to be in the first chunk 221a, the remaining chunks 221b-221n need not be searched and/or synchronized.

Figure 9:
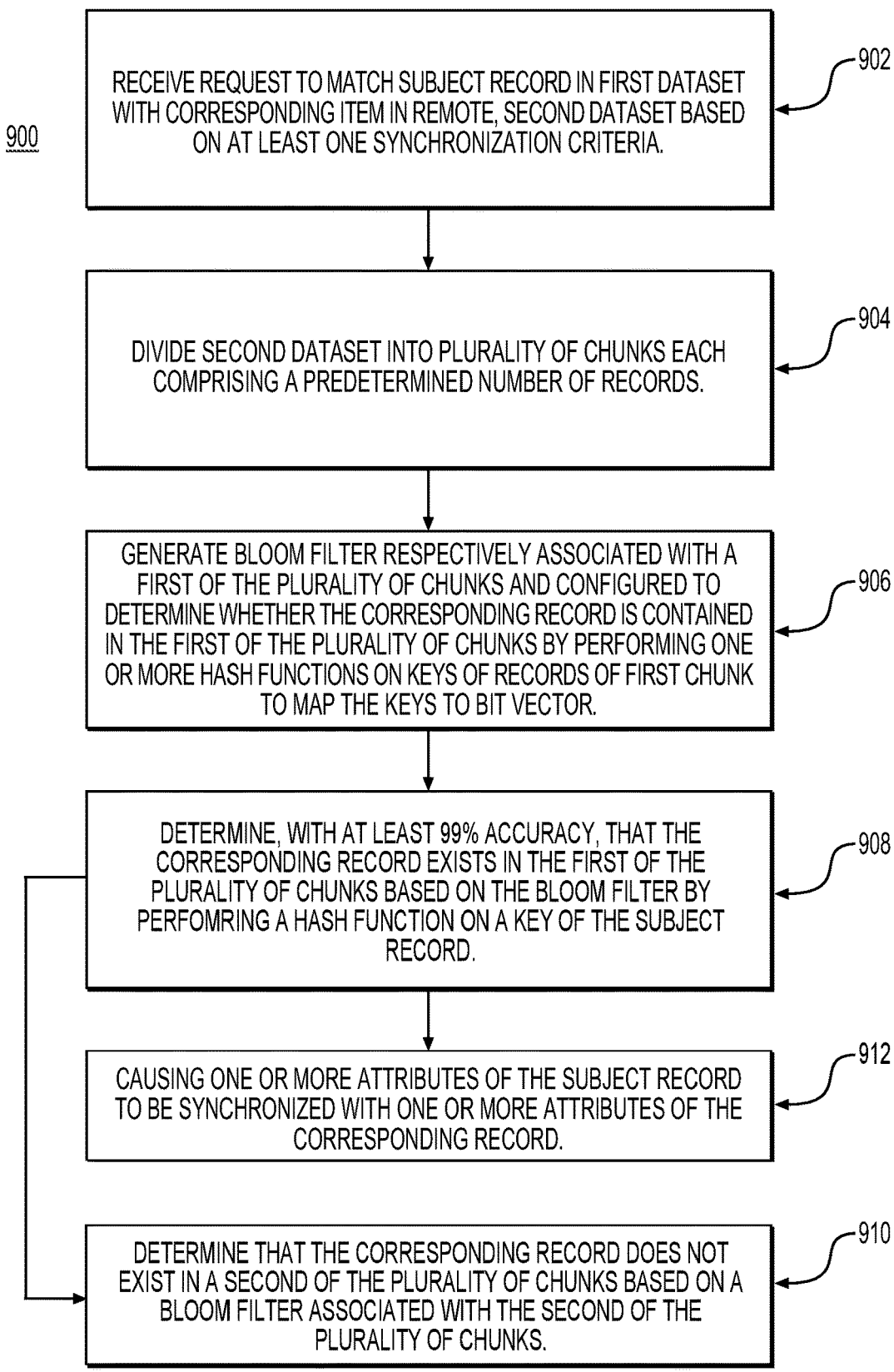
FIG. 9 depicts a flowchart of a method for synchronizing data between a plurality of datasets, according to one or more embodiments.

FIG. 9 method illustrates method 900 of utilizing a probabilistic data structure to synchronize records between a plurality of datasets. In some embodiments, each of steps 902-912 are performed by controller 1000 associated with user device(s) 105. In some embodiments, each of steps 902-912 are performed by controller 1000 associated with data storage system(s) 125. In some embodiments, each of steps 902-912 are performed by controller 1000 associated with connected device(s) 145. In some embodiments, steps 902-912 are performed by a plurality of connected controllers. For example, some of steps 902-912 are performed by a controller associated with user device(s) 105, and others of steps 902-912 are performed by a controller associated with connected device(s) 145.

As shown in FIG. 9, at step 902, method 900 includes receiving a request to match a subject record in first dataset 210 with a corresponding record in a remote, second dataset 220 based on at least one synchronization criteria, similar to step 802 of method 800

With continued reference to FIG. 9, at step 904, method 900 includes dividing second dataset 220 into plurality of chunks 221a-221n, as in step 804 of method 800.

With continued reference to FIG. 9, at step 906, method 900 includes generating a probabilistic data structure 325a including a Bloom filter respectively associated with a first of the plurality of chunks 221a. The Bloom filter is configured to determine whether the corresponding record is contained in the first of the plurality of chunks 221a. Probabilistic data structures 325b-325n including Bloom filters are likewise generated and respectively associated with the remaining chunks 221b-221n. In some embodiments, generating the Bloom filters includes performing one or hash functions on keys of records in the associated chunk 221a-221n to map keys to bit vector 710, as described herein with reference to FIG. 7. Each of the Bloom filters is stored in memory of one or more devices in a horizontally scalable network. For example, each of the Bloom filters may be stored on a separate device in communication with network 130.

With continued reference to FIG. 9, at step 908, method 900 includes determining, within at least 99% accuracy, that the corresponding record is present in the first of the plurality of chunks 221a based on the Bloom filter. In particular, the Bloom filter performs one or more hash functions (e.g., hash function 702, 704 of FIG. 7) on the attribute key of subject record to determine whether a relationship exists between subject record and any record in chunk 221a, as illustrated in FIG. 7. The level of accuracy is the rate at which the Bloom filter correctly determines that such a relationship exists, without giving a false positive result. As noted herein, a false negative is not possible in a Bloom filter. As described herein, the accuracy of the Bloom filter can be adjusted by altering the number of records in the filter (n); number of bits in the bit vector (m); and/or number of hash functions (k).

In some embodiments, step 908 may repeated for each chunk 221*b*-221*n* to identify all chunks with contain a record corresponding to the subject record of dataset 210. Any chunks 221*b*-221 that do not include a record corresponding to the subject record are then omitted from the remaining steps of method 900. For example, second chunk 221*b* may not contain a record corresponding to the subject record of dataset 210, so step 910 of method 900 may include determining that a corresponding record does not exist in second chunk 221*b* based on probabilistic data structure 325*b*.

With continued reference to FIG. 9, at step 912, method 900 includes causing one or more attributes of the subject record of first dataset 210 to be synchronized with one or more attributes of the corresponding record of chunk 221*a* of second dataset 220. In some embodiments, synchronization may include updating values of one or more attributes of the subject record in first dataset 210 to match the values of corresponding attributes in the corresponding record in second dataset 220. In some embodiments, synchronization may include updating values of one or more attributes of the corresponding record in second dataset 220 to match the values of corresponding attributes in the subject record in first dataset 210.

In some embodiments, causing synchronization may be performed directly by the processor of user device 105—i.e. the processor of user device 105 changes one or more attributes in the first and/or second dataset. In other embodiments, particularly where user device 105 does not have direct access to second dataset, causing synchronization may include the processor of user device 105 sending a request to another processor/device (e.g. a processor of data storage system 125) to perform synchronization of the subject record and corresponding record. In some examples, causing synchronization may occur automatically at predetermined time intervals, independent of user involvement. In some examples, causing synchronization may occur automatically in response to a triggering event, independent of user involvement.

In some embodiments, each of the plurality of chunks 221*a*-221*n* is synchronizable independent of the other chunks. That is, synchronization of records in the first chunk 221*a* can be performed without any activity being performed on the other chunks. Thus, if the corresponding record is determined to be in the first chunk 221*a*, the reaming chunks 221*b*-221*n* need not be searched and/or synchronized.

Step 912 may be repeated for each chunk 221*b*-221 that contain a record corresponding to the subject record of dataset 210, as determined at step 908. Step 912 is not performed for any chunks 221*a*-221*n* that do not contain a record corresponding to the subject record of dataset 210, as determined a step 910. Thus, computational resources are not wasted processing chunks that will be of no value in the synchronization operation.

Figure 10:
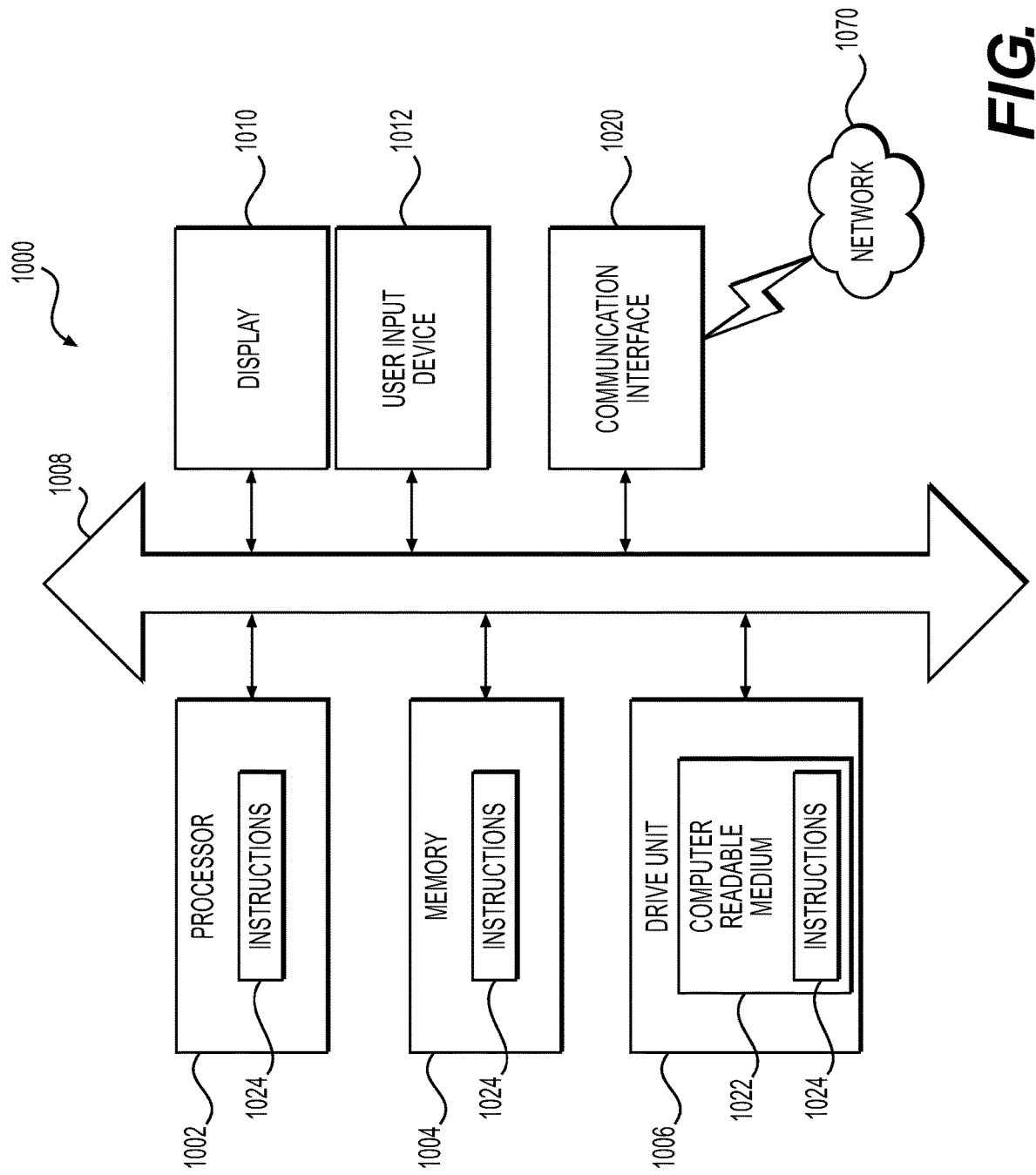
FIG. 10 depicts an implementation of a computer system that may execute techniques presented herein, according to one or more embodiments.

FIG. 10 depicts an implementation of a controller 1000 that may execute techniques presented herein, according to one or more embodiments.

The controller 1000 may include a set of instructions that can be executed to cause the controller 1000 to perform any one or more of the methods or computer based functions disclosed herein. The controller 1000 may operate as a standalone device or may be connected, e.g., using a network, to other computer systems or peripheral devices.

In a networked deployment, the controller 1000 may operate in the capacity of a server or as a client in a server-client user network environment, or as a peer computer system in a peer-to-peer (or distributed) network environment. The controller 1000 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a headset, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 1000 can be implemented using electronic devices that provide voice, video, or data communication. Further, while the controller 1000 is illustrated as a single system, the term "system" shall also be taken to include any collection of systems or sub-systems that individually or jointly execute a set, or multiple sets, of instructions to perform one or more computer functions.

As illustrated in FIG. 10, the controller 1000 may include at least one processor 1002, e.g., a central processing unit (CPU), a graphics processing unit (GPU), or both. The processor 1002 may be a component in a variety of systems. For example, the processor 1002 may be part of a standard computer. The processor 1002 may be one or more general processors, digital signal processors, application specific integrated circuits, field programmable gate arrays, servers, networks, digital circuits, analog circuits, combinations thereof, or other now known or later developed devices for analyzing and processing data. The processor 1002 may implement a software program, such as code generated manually (i.e., programmed).

The controller 1000 may include a memory 1004 that can communicate via a bus 1008. The memory 1004 may be a main memory, a static memory, or a dynamic memory. The memory 1004 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 1004 includes a cache or random-access memory for the processor 1002. In alternative implementations, the memory 1004 is separate from the processor 1002, such as a cache memory of a processor, the system memory, or other memory. The memory 1004 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1004 is operable to store instructions executable by the processor 1002. The functions, acts or tasks illustrated in the figures or described herein may be performed by the processor 1002 executing the instructions stored in the memory 1004. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the controller 1000 may further include a display 1010, such as a liquid crystal display (LCD), an organic light emitting diode (OLED), a flat panel display, a solid-state display, a cathode ray tube (CRT), a projector, a printer or other now known or later developed display device for outputting determined information. The display 1010 may act as an interface for the user to see the functioning of the processor 1002, or specifically as an interface with the software stored in the memory 1004 or in the drive unit 1006.

Additionally or alternatively, the controller 1000 may include an input device 1012 configured to allow a user to interact with any of the components of controller 1000. The input device 1012 may be a number pad, a keyboard, or a cursor control device, such as a mouse, or a joystick, touch screen display, remote control, headset, or any other device operative to interact with the controller 1000.

The controller 1000 may also or alternatively include drive unit 1006 implemented as a disk or optical drive. The drive unit 1006 may include a computer-readable medium 1022 in which one or more sets of instructions 1024, e.g. software, can be embedded. Further, the instructions 1024 may embody one or more of the methods or logic as described herein. The instructions 1024 may reside completely or partially within the memory 1004 and/or within the processor 1002 during execution by the controller 1000. The memory 1004 and the processor 1002 also may include computer-readable media as discussed above.

In some systems, a computer-readable medium 1022 includes instructions 1024 or receives and executes instructions 1024 responsive to a propagated signal so that a device connected to a network 1070 can communicate voice, video, audio, images, or any other data over the network 1070. Further, the instructions 1024 may be transmitted or received over the network 1070 via a communication port or interface 1020, and/or using a bus 1008. The communication port or interface 1020 may be a part of the processor 1002 or may be a separate component. The communication port or interface 1020 may be created in software or may be a physical connection in hardware. The communication port or interface 1020 may be configured to connect with a network 1070, external media, the display 1010, or any other components in controller 1000, or combinations thereof. The connection with the network 1070 may be a physical connection, such as a wired Ethernet connection or may be established wirelessly as discussed below. Likewise, the additional connections with other components of the controller 1000 may be physical connections or may be established wirelessly. The network 1070 may alternatively be directly connected to a bus 1008.

While the computer-readable medium 1022 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 1022 may be non-transitory, and may be tangible.

The computer-readable medium 1022 can include a solid-state memory such as a memory card or other package that houses one or more non-volatile read-only memories. The computer-readable medium 1022 can be a random-access memory or other volatile re-writable memory. Additionally or alternatively, the computer-readable medium 1022 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The controller 1000 may be connected to a network 1070. The network 1070 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 1070 may include wide area networks (WAN), such as the Internet, local area networks (LAN), campus area networks, metropolitan area networks, a direct connection such as through a Universal Serial Bus (USB) port, or any other networks that may allow for data communication. The network 1070 may be configured to couple one computing device to another computing device to enable communication of data between the devices. The network 1070 may generally be enabled to employ any form of machine-readable media for communicating information from one device to another. The network 1070 may include communication methods by which information may travel between computing devices. The network 1070 may be divided into sub-networks. The sub-networks may allow access to all of the other components connected thereto or the sub-networks may restrict access between the components. The network 1070 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions.

Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for synchronizing data between a plurality of datasets, the method comprising:
   receiving, by at least one processor, a request to match a subject record in a first dataset with a corresponding record in a remote, second dataset based on at least one synchronization criteria;
   dividing, by at least one processor, the second dataset into a plurality of chunks each comprising a predetermined number of records;
   generating, by at least one processor, a probabilistic data structure respectively associated with a first of the plurality of chunks and configured to determine whether the corresponding record is contained in the first of the plurality of chunks, wherein said generating the probabilistic data structure associated with the first of the plurality of chunks comprises performing one or more hash functions on keys of records in the associated chunk to map the keys to a bit vector; and
   determining, by at least one processor, within a predetermined level of accuracy, that the corresponding record is present in the first of the plurality of chunks based on the probabilistic data structure, wherein said determining that the corresponding record exists in the first of the plurality of chunks comprises performing a hash function on a key of the subject record; and
   causing, by at least one processor, one or more attributes of the subject record to be synchronized with one or more attributes of the corresponding record based on existence of the corresponding record in the first of the plurality of chunks.

2. The method of claim 1, wherein the probabilistic data structure comprises a Bloom filter.

3. The method of claim 1, wherein the predetermined level of accuracy is at least 99%.

4. The method of claim 1, further comprising:
   generating, by at least one processor, a probabilistic data structure respectively associated with a second of the plurality of chunks and configured to determine whether the corresponding record is contained in the second of the plurality of chunks; and
   determining, with at least one processor, that the corresponding record does not exist in the second of the plurality of chunks based on the probabilistic data structure.

5. The method of claim 1, wherein each of the plurality of chunks is synchronizable independent of the other chunks.

6. The method of claim 1, wherein the at least one synchronization criteria comprises one or more attributes that satisfy an equation for determining correlation between the subject record in the first dataset and the corresponding record in the second dataset.

7. A system for synchronizing data between a plurality of datasets, the system comprising: at least one memory having processor-readable instructions stored therein; and at least one processor configured to access the memory and execute the processor-readable instructions, which when executed by the processor configure the processor to perform a plurality of functions, including functions for:
   receiving, by at least one processor, a request to match a subject record in a first dataset with a corresponding record in a remote, second dataset based on at least one synchronization criteria;
   dividing, by at least one processor, the second dataset into a plurality of chunks each comprising a predetermined number of records;
   generating, by at least one processor, a probabilistic data structure respectively associated with a first of the plurality of chunks and configured to determine whether the corresponding record is contained in the first of the plurality of chunks, wherein the generating the probabilistic data structure associated with the first of the plurality of chunks comprises performing one or more hash functions on keys of records in the associated chunk to map the keys to a bit vector;
   determining, by at least one processor, within a predetermined level of accuracy, that the corresponding record is present in the first of the plurality of chunks based on the probabilistic data structure, wherein determining that the corresponding record exists in the first of the plurality of chunks comprises performing a hash function on a key of the subject record; and
   causing, by at least one processor, one or more attributes of the subject record to be synchronized with one or more attributes of the corresponding record based on existence of the corresponding record in the first of the plurality of chunks.

8. The system of claim 7, wherein the probabilistic data structure comprises a Bloom filter.

9. The system of claim 7, wherein the predetermined level of accuracy is at least 99%.

10. The system of claim 7, wherein the plurality of functions further comprises:
    generating, by at least one processor, a probabilistic data structure respectively associated with a second of the plurality of chunks and configured to determine whether the corresponding record is contained in the second of the plurality of chunks; and
    determining, with at least one processor, that the corresponding record does not exist in the second of the plurality of chunks based on the probabilistic data structure.

11. The system of claim 7, wherein each of the plurality of chunks is synchronizable independent of the other chunks.

12. The system of claim 7, wherein the at least one synchronization criteria comprises one or more attributes that satisfy an equation for determining correlation between the subject record in the first dataset and the corresponding record in the second dataset.

13. A non-transitory computer-readable medium containing instructions synchronizing data between a plurality of datasets, the non-transitory computer-readable medium storing instructions that, when executed by at least one processor, configure the at least one processor to perform:
- receiving, by at least one processor, a request to match a subject record in a first dataset with a corresponding record in a remote, second dataset based on at least one synchronization criteria;
- dividing, by at least one processor, the second dataset into a plurality of chunks each comprising a predetermined number of records;
- generating, by at least one processor, a probabilistic data structure respectively associated with a first of the plurality of chunks and configured to determine whether the corresponding record is contained in the first of the plurality of chunks, wherein the generating the probabilistic data structure associated with the first of the plurality of chunks comprises performing one or more hash functions on keys of records in the associated chunk to map the keys to a bit vector;
- determining, by at least one processor, within a predetermined level of accuracy, that the corresponding record is present in the first of the plurality of chunks based on the probabilistic data structure, wherein determining that the corresponding record exists in the first of the plurality of chunks comprises performing a hash function on a key of the subject record; and
- causing, by at least one processor, one or more attributes of the subject record to be synchronized with one or more attributes of the corresponding record based on existence of the corresponding record in the first of the plurality of chunks.

14. The non-transitory computer-readable medium system of claim 13, wherein the probabilistic data structure comprises a Bloom filter.

15. The non-transitory computer-readable medium system of claim 13, wherein the predetermined level of accuracy is at least 99%.

16. The non-transitory computer-readable medium system of claim 13, wherein the instructions further configure the at least one processor to perform:
- generating, by at least one processor, a probabilistic data structure respectively associated with a second of the plurality of chunks and configured to determine whether the corresponding record is contained in the second of the plurality of chunks; and
- determining, with at least one processor, that the corresponding record does not exist in the second of the plurality of chunks based on the probabilistic data structure.

17. The non-transitory computer-readable medium system of claim 13, wherein each of the plurality of chunks is synchronizable independent of the other chunks.

* * * * *